United States Patent
Kim et al.

(10) Patent No.: US 10,447,584 B2
(45) Date of Patent: Oct. 15, 2019

(54) MEMORY NETWORK AND SYSTEM INCLUDING THE SAME

(71) Applicants: SK Hynix Inc., Icheon (KR); KOREA ADVANCED INSTITUTE OF SCIENCE AND TECHNOLOGY, Daejeon (KR)

(72) Inventors: Gwangsun Kim, Ansan (KR); John Dongjun Kim, Seoul (KR); Yong-Kee Kwon, Icheon (KR)

(73) Assignees: SK HYNIX INC., Icheon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 124 days.

(21) Appl. No.: 14/976,578

(22) Filed: Dec. 21, 2015

(65) Prior Publication Data

US 2017/0075578 A1    Mar. 16, 2017

(30) Foreign Application Priority Data

Sep. 15, 2015    (KR) .................. 10-2015-0130004

(51) Int. Cl.
  *G06F 12/00*    (2006.01)
  *H04L 12/721*    (2013.01)
(52) U.S. Cl.
  CPC .............. *H04L 45/40* (2013.01); *G06F 12/00* (2013.01)
(58) Field of Classification Search
  CPC ........................................................ G06F 12/00
  USPC ........................................................ 711/154
  See application file for complete search history.

(56) References Cited

U.S. PATENT DOCUMENTS

| | | | | |
|---|---|---|---|---|
| 2012/0106228 A1* | 5/2012 | Lee | .......................... | G11C 5/06 365/63 |
| 2013/0092936 A1* | 4/2013 | Yang | ..................... | H01L 25/065 257/48 |
| 2014/0169211 A1* | 6/2014 | Harper | ..................... | H04L 45/06 370/254 |
| 2014/0281204 A1* | 9/2014 | Jeddeloh | ................ | G11C 5/066 711/106 |
| 2015/0324319 A1* | 11/2015 | Leidel | ................. | G06F 13/1673 711/148 |
| 2016/0092362 A1* | 3/2016 | Barron | ................ | G06F 12/0835 710/308 |
| 2016/0149780 A1* | 5/2016 | Hsu | ..................... | G06F 15/7825 370/252 |

FOREIGN PATENT DOCUMENTS

KR    10-2015-0028520 A    3/2015

OTHER PUBLICATIONS

Gwangsun Kim et al., "Memory-centric System Interconnect Design with Hybrid Memory Cubes," 978-1-4799-1021-2/13, 2013, pp. 145-155, IEEE.

* cited by examiner

*Primary Examiner* — Gautam Sain

(57) ABSTRACT

A memory network includes a first local memory group, a second local memory group, and multiple first channels. The first local memory group includes multiple first memory devices that are not directly connected to each other. The second local memory group includes multiple second memory devices that are not directly connected to each other. The first channels are configured to connect the first memory devices to the second memory devices in a one to one relationship.

9 Claims, 5 Drawing Sheets

MEMORY NETWORK AND SYSTEM INCLUDING THE SAME

CROSS-REFERENCE TO RELATED APPLICATIONS

The present application claims priority to Korean Patent Application No. 10-2015-0130004, filed on Sep. 15, 2015, which is incorporated herein by reference in its entirety.

BACKGROUND

1. Field

Embodiments of the present disclosure relate to a memory network and a system including the same, and more particularly, to a memory network that is capable of increasing expandability while maintaining substantially the same performance as a conventional memory network, and a system including the same.

2. Description of the Related Art

Recently, memory networks that connect memory devices having router functions, such as hybrid memory cubes (HMCs), have been developed.

A memory network may connect a plurality of central processing units (CPUs) or graphic processing units (GPUs). The memory network and the CPUs or GPUs connected by the memory network may provide a system.

FIG. 1 is a structure diagram of a system including a conventional memory network 10.

The conventional memory network 10 has a dFBFLY (distributor-based Flattened Butterfly) structure.

Hereafter, the term "conventional memory network" refers to a memory network having a dFBFLY structure, and the term "conventional system" refers to a system in which a processor is connected to a memory network having the dFBFLY structure.

In FIG. 1, arrows represent memory channels 2 and processor channels 3. The memory channels 2 are formed between memory devices 11, and the processor channels 3 are each formed between a memory device 11 and a processor 1.

The conventional memory network 10 includes a plurality of memory devices 11 arranged in a grid pattern that includes rows and columns. Each memory device 11 is connected to other memory devices 11 in the same column or the same row by the memory channels 2.

In the conventional system, each of four processors 1 is directly connected to the memory devices 11 included in a corresponding one of four columns by the processor channels 3. The processor 1 may not be directly connected to memory devices 11 in other columns. The processor 1 may be a CPU or GPU.

Since the conventional memory network 10 has higher connectivity than other memory networks known in the art, the conventional memory network 10 provides relatively high performance. However, the conventional memory network 10 has low expandability.

Thus, there is a demand for a new memory network structure with greater expandability and greater or equal performance to the conventional memory network 10.

SUMMARY

Various embodiments of the present disclosure are directed to a memory network that is capable of increasing expandability while maintaining substantially the same performance as a conventional memory network, and a system including the same.

In an embodiment, a memory network may include: a first local memory group including a plurality of first memory devices that are not directly connected to each other; a second local memory group including a plurality of second memory devices that are not directly connected to each other; and a plurality of first channels configured to connect the plurality of first memory devices to the plurality of second memory devices in a one to one relationship.

In an embodiment, a system may include: a first processor; a first local memory group including a plurality of first memory devices that are not directly connected to each other and connected to the first processor through a plurality of second channels, respectively; a second processor; a second local memory group including a plurality of second memory devices that are not directly connected to each other, the plurality of second memory devices connected to the second processor through a plurality of respective third channels; and a plurality of first channels configured to connect the plurality of first memory devices to the plurality of second memory devices in a one to one relationship.

DETAILED DESCRIPTION

Figure 1:
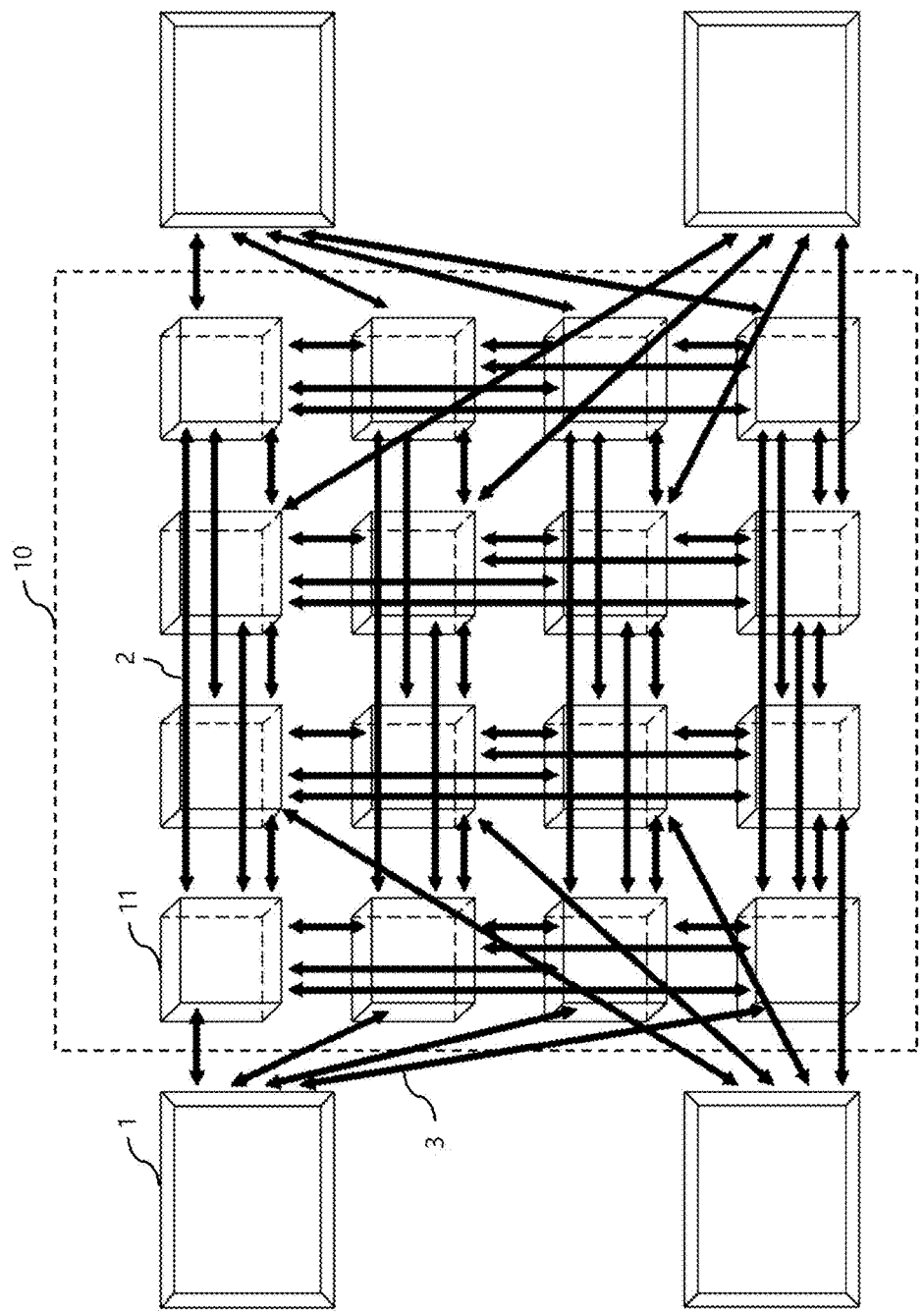
FIG. 1 is a structure diagram of a system including the conventional memory network 10.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 2:
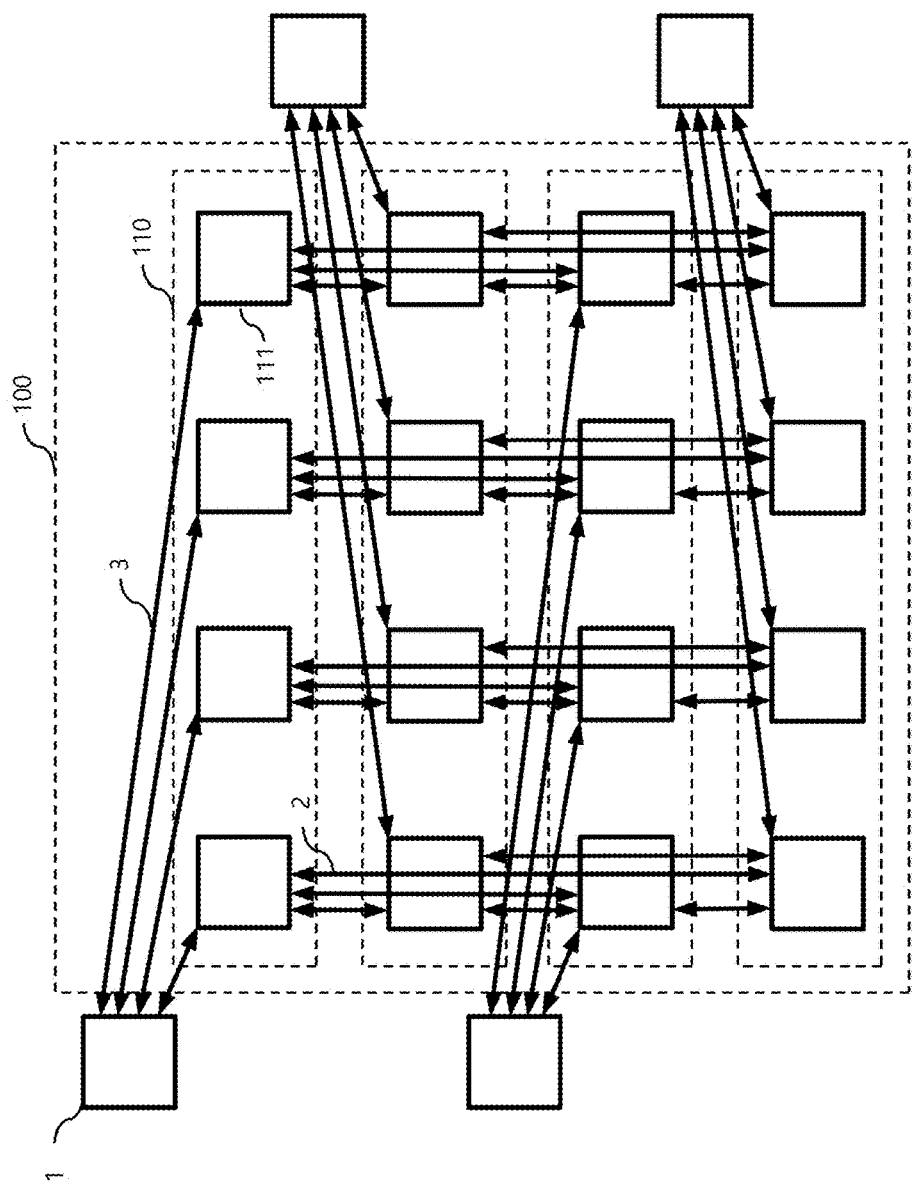
FIG. 2 is a structure diagram of a system including a memory network in accordance with an embodiment of the present disclosure.

FIG. 2 is a structure diagram of a system including a memory network 100 in accordance with an embodiment of the present disclosure.

The memory network 100 illustrated in FIG. 2 has a Sliced Flattened Butterfly (sFBFLY) structure.

The memory network 100 includes a plurality of memory devices 111.

In FIG. 2, the memory devices 111 are arranged in a grid pattern within the memory network 100. The grid pattern may include rows and columns. However, in another embodiment, the memory devices 111 can be arranged in a different pattern within the memory network 100 while maintaining the same topology.

The memory network 100 includes a plurality of local memory groups 110, and each of the local memory groups 110 includes a plurality of memory devices 111. In an embodiment, each local memory group 110 is a complete row of memory devices 111 within the grid pattern. Unlike the conventional memory network 10 of FIG. 1, the memory devices 111 within each local memory group 110 are not directly connected to one another by channels.

A set of the local memory groups 110 may be referred to as a cluster.

The memory devices 111 in the same row form one local memory group 110.

In FIG. 2, arrows represent memory channels 2 and processor channels 3. The memory channels 2 are formed between the memory devices 111, and the processor channels 3 are each formed between a memory device 111 and a processor 1. The memory channels 2 and the processor channels 3 may have the same specification or different specifications.

Each local memory group 110 may be associated with one or more processors 1. In FIG. 2, one processor 1 is associated with one local memory group 110.

The memory devices 111 within the local memory group 110 may be connected to the associated processor 1 by the processor channels 3, respectively.

Memory devices 111 within the same column are connected to one another through the memory channels 2. However, in an embodiment, the memory channels 2 do not connect memory devices 111 within the same local memory group 110. That is, the memory channels 2 according to an embodiment of the present disclosure only directly connect memory devices 111 within the same column.

Compared to the conventional memory network 10, the memory network 100 in accordance with the present embodiment lacks memory channels 2 between memory devices 111 within the same row or local memory group 110. Thus, memory devices 2 within a specific local memory group 110 are not directly connected to each other by memory channels 2.

Thus, since the memory network 100 of FIG. 2 requires fewer channels to connect the memory devices 111 therein than the conventional memory network 10, the memory network 100 may be constructed at a lower cost than the conventional memory network 10.

In an embodiment, the minimum routing path between an arbitrary processor 1 and an arbitrary memory device 111 is the same as that of the conventional memory network 10, but the number of non-minimum routing paths is smaller than that of the conventional memory network 10.

A data packet transmitted between two memory devices 111 belonging to the same memory group 110 may be transmitted through the associated processor 1. Thus, a time delay corresponding to one channel may occur, compared to packet transmission using the conventional memory network.

However, almost all data traffic within the memory network 100 occurs between the processors 1 and the memory devices 111, and almost no data traffic occurs between the memory devices 111. Thus, although the number of non-minimum routing paths is smaller, the reduction does not significantly affect the performance of the memory network 100.

The memory devices 111 within the memory network 100 in accordance with the present embodiment may be managed by integrated physical addresses. That is, the processors 1 connected to the memory network 100 may share the same address table.

Thus, when memory access operations are uniformly distributed to all of the memory devices 111 within the memory network 100 through address multiplexing, the possibility of competition for the minimum routing path may be reduced, which makes it possible to lower the probability that a non-minimum routing path will be used. That is, address multiplexing may reduce the likelihood that a packet will be transferred along a non-minimum routing path.

For example, when a low-order bit of a logical address is used to select a physical memory device 111, the memory access operations can be uniformly distributed to all of the memory devices 111 within the memory network 100.

Thus, although the memory network 100 contains fewer non-minimum routing paths than the conventional memory network 10, the memory network 100 and the conventional memory network 10 have similar performances.

Figure 3:
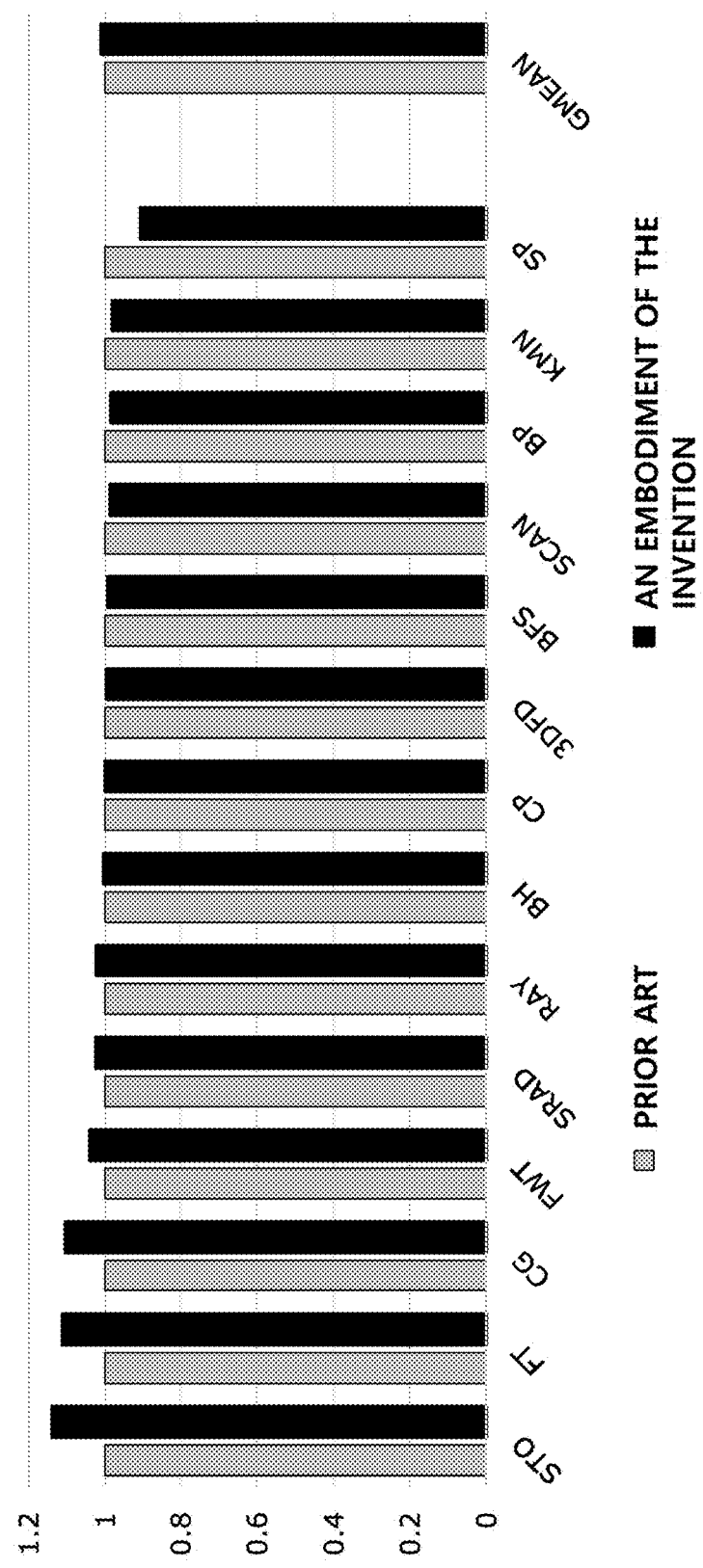
FIG. 3 is a graph illustrating the performance of the memory network in accordance with an embodiment of the present disclosure.

FIG. 3 is a graph illustrating the performance of the system including the memory network 100 in accordance with an embodiment of the present disclosure.

In the graph of FIG. 3, the horizontal axis indicates simulation types. In the horizontal axis, the last item GMEAN indicates the geometric mean of the results of the entire simulation.

The vertical axis indicates a normalized kernel run time. A lower kernel run time is generally preferred.

In FIG. 3, the system in accordance with the present embodiment is represented by black bars, and the conventional system is represented by gray bars.

Referring to FIG. 3, the conventional system exhibited better performance in some simulations, and the system in accordance with the present embodiment exhibited better performance in some simulations. On average, a performance difference of about 1% occurred between the conventional system and the system in accordance with the present embodiment.

That is, as described above, although the memory network 100 includes fewer non-minimum routing paths than the conventional memory network 10, because the memory network 100 lacks channels connecting the memory devices 111 within each local memory group 110 to each other, the performance difference between the memory network 100 and the conventional memory network 10 is insignificant.

Figure 4:
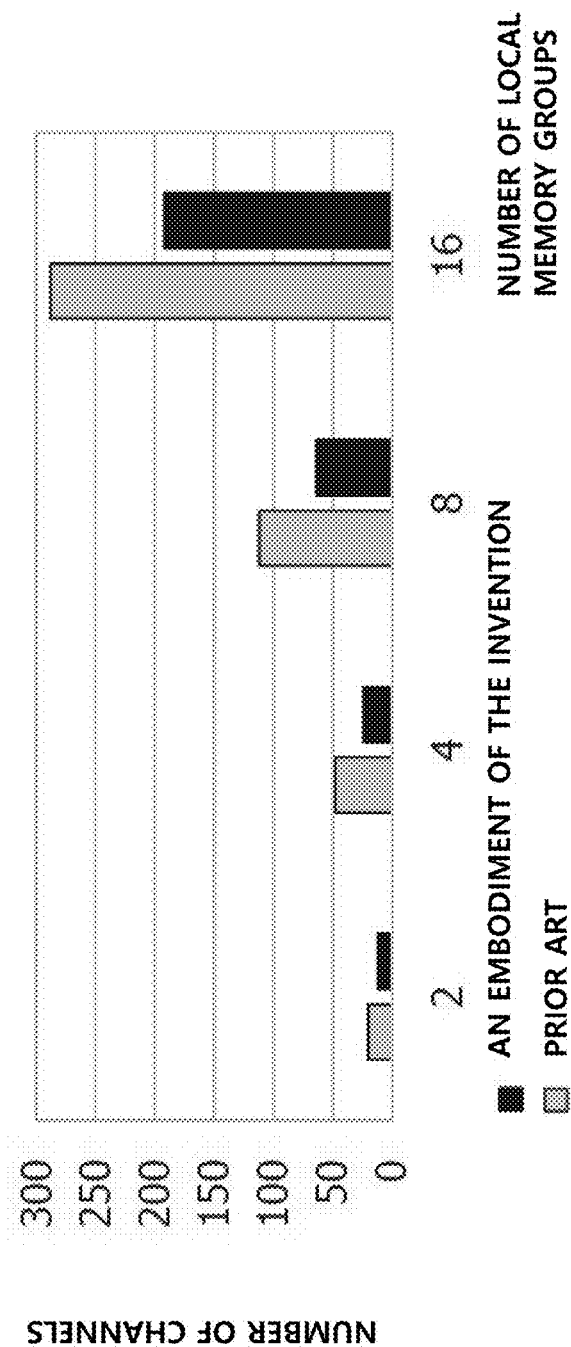
FIG. 4 is a graph illustrating the expandability of the memory network in accordance with an embodiment of the present disclosure.

FIG. 4 is a graph illustrating the expandability of the memory network 100 in accordance with the embodiment of the present disclosure.

When a single processor 1 is connected to each local memory group 110, the total number of local memory groups 110 in the memory network 100 may be equal to the total number of processors 1.

In FIG. 4, the memory network 100 in accordance with the present embodiment is represented by black bars, and the conventional memory network 10 is represented by gray bars.

As illustrated in FIG. 4, the memory network 100 includes fewer channels than the conventional memory network 10, regardless of the number of local memory groups 110 in the memory network 100.

For example, when the memory network 100 includes four local memory groups 110 and each local memory group 110 includes four memory devices 111 as illustrated in FIG. 2, the memory network 100 operates with 50% fewer channels than the conventional memory network 10 illustrated in FIG. 1. When the memory network includes eight local memory groups 110, the memory network 100 operates with 43% fewer channels than the conventional memory network illustrated in FIG. 1. When the memory network 100 includes 16 local memory groups 110, the memory network 100 operates with 33% fewer channels than the conventional memory network 10 illustrated in FIG. 1.

Given a predetermined number of channels, the memory network 100 may connect a larger number of memory devices or a larger number of local memory groups than the conventional memory network 10. Thus, the expandability of the memory network 100 in accordance with the present embodiment can be significantly improved in comparison to the conventional memory network 10.

In accordance with the embodiment of the present disclosure, a memory network having a larger scale than and an equal number of channels to the conventional memory network 10 can be constructed, while maintaining substantially the same performance.

Each of the processors 1 connected to the memory network 100 in accordance with the present embodiment may be CPUs or GPUs. Alternatively, some of the processors 1 may be CPUs, and the other processors 1 may be GPUs.

The memory network 100 is a Unified Memory Network (UMN) when it is connected to both CPUs and GPUs.

In general, CPU performance is significantly affected by latency. Thus, a UMN may improve CPU performance by reducing the latency of data packets transferred between the CPUs and the memory devices 111 in the memory network 100.

Figure 5:
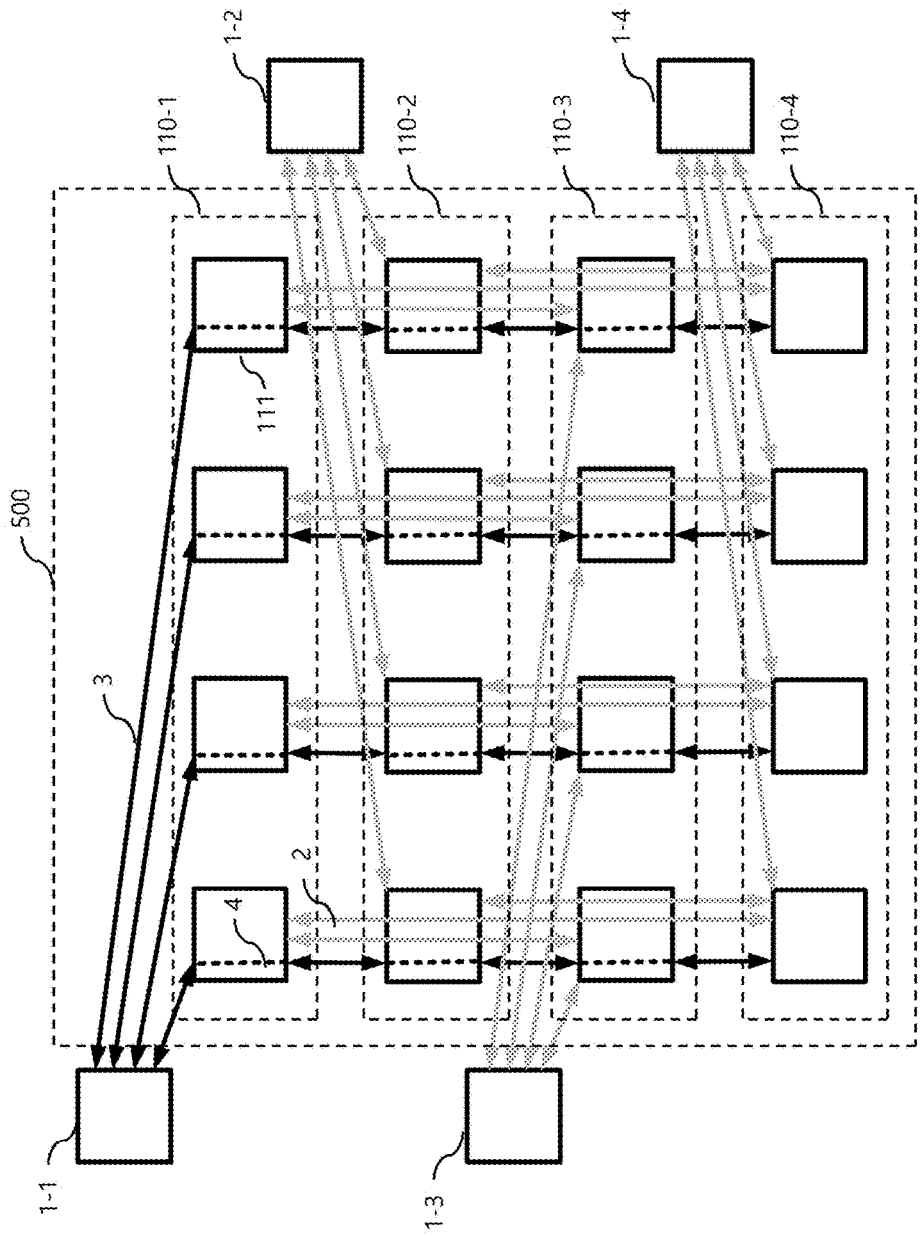
FIG. 5 is a structure diagram of a system in which a memory network, CPUs, and GPUs are connected to one another in accordance with an embodiment of the present disclosure.

FIG. 5 is a structure diagram of a system including a UMN 500.

The UMN 500 has substantially the same structure as the memory network 100 of FIG. 2.

In FIG. 5, a processor 1-1 connected to a first local memory group 110-1 is a CPU, and processors 1-2, 1-3, and 1-4 connected to the other local memory groups 110-2 to 110-4 are GPUs.

One of a plurality of memory devices 111 performing a routing function may include a pass-thru path 4 which outputs an input signal without alteration.

When a processor accesses a remote memory device 111 that is separated from the processor, an increased hopping count may occur. However, transferring packets through the pass-thru path 4 may reduce relative latency.

Thus, using a path including pass-thru paths 4 of multiple memory devices 111 may produce a smaller latency than using the minimum path, even though the minimum path may have a small hopping count.

Since the structure and operation principle of the pass-thru paths 4 are known in the art, the detailed descriptions thereof are omitted herein.

In the present embodiment, a data packet associated with a CPU preferentially passes through the pass-thru paths 4 within the memory devices 111, compared to a data packet associated with a GPU. Thus, latency of data packets associated with the CPU may be reduced.

In an embodiment, each of the memory devices 111 may include a pass-thru path 4. However, in each column, the memory device 111 that is farthest from the CPU 1-1 may not use a pass-thru path 4.

Thus, FIG. 5 illustrates that the memory devices 111 in the outermost local memory group 110-4 lack pass-thru paths 4.

In an embodiment, a pass-thru path 4 of a memory device 111 may be fixed between adjacent memory devices 111 or between input/output ports connected to an adjacent CPU and an adjacent memory device.

In another embodiment, an internal path of a memory device 111 can be switched to form a pass-thru path 4 between arbitrary input/output ports within the memory device 111.

In FIG. 5, the black channels 2 and 3 and the black pass-thru paths 4 pass data packets associated with the CPU 1-1 with a higher priority than the gray channels 2 and 3 that pass data packets associated with the GPUs 1-2, 1-3, and 1-4.

However, when heavy congestion occurs in a routing path that includes at least one of the pass-thru paths 4, due to large bandwidth requirements of the CPU, the data packet associated with the CPU 1-1 may be routed to an alternative path that does not include at least one of the pass-thru paths 4.

A specific routing condition for such an exceptional case may be changed in various manners according to the design of the routing algorithm. However, the specific routing algorithm may depart from the scope of the present disclosure.

In accordance with the embodiments of the present disclosure, memory networks with sFBFLY structures and systems including the same can have significantly improved expandability and have the substantially same performance as the conventional memory network 10 and the conventional system.

Although various embodiments have been described for illustrative purposes, it will be apparent to those skilled in the art that various changes and modifications may be made without departing from the spirit and scope of the disclosure as defined in the following claims.

What is claimed is:

1. A memory network comprising:
a plurality of memory devices arranged in a matrix as a plurality of rows provided along a first direction of the matrix and a plurality of columns provided along a second direction of the matrix that is different from the first direction, the plurality of rows including a first row of memory devices, a second row of memory devices, and a third row of memory devices, the plurality of columns including a first column of memory devices including a first memory device of the plurality of memory devices, a second memory device of the plurality of memory devices, and a third memory device of the plurality of memory devices, such that the first memory device is comprised in the first row, the second memory device is comprised in the second row, and the third memory device is comprised in the third row;
a plurality of memory channels including a first memory channel directly connecting the first memory device and the second memory device of the first column and a second memory channel directly connecting the first memory device and the third memory device of the first column, the second memory device being disposed between the first memory device and the third memory device, wherein the memory devices in the first column are not directly connected to memory devices in any other column of the plurality of columns; and
a plurality of processor channels including a first processor channel connecting each of the memory devices in the first row to only a first processor of a plurality of processors, a second processor channel connecting each of the memory devices in the second row to only a second processor of the plurality of processors, and a third processor channel connecting each of the memory devices in the third row to only a third processor of the plurality of processors,
wherein the first processor channel does not directly connect to any of the memory devices in the second row and the third row, the second processor channel does not directly connect to any of the memory devices in the first row and the third row, and the third processor channel does not directly connect to any of the memory devices in the first row and the second row, and wherein the memory devices in the first row are not directly connected to other memory devices in the first row, the memory devices in the second row are not directly connected to other memory devices in the second row, and the memory devices in the third row are not directly connected to other memory devices in the third row.

2. The memory network of claim 1, wherein each of the plurality of processors is a CPU or a GPU.

3. The memory network of claim 1, wherein each of the plurality of memory devices comprises a pass-thru path configured to directly output an input signal, and the pass-thru path is configured to connect two neighboring memory devices in a column among the plurality of columns or to connect any of memory devices in the column and a corresponding processor of the plurality of processors.

4. The memory network of claim 3, wherein in a first routing path including the pass-thru path, a first data packet associated with the first processor has a higher routing priority than a second data packet associated with the second processor, wherein the first processor is a CPU and the second processor is a GPU.

5. A system comprising:
a plurality of processors;
a plurality of memory devices arranged in a matrix as a plurality of rows provided along a first direction of the matrix and a plurality of columns provided along a second direction of the matrix that is different from the first direction, the plurality of rows including a first row of memory devices, a second row of memory devices, and a third row of memory devices, the plurality of columns including a first column of memory devices including a first memory device of the plurality of memory devices, a second memory device of the plurality of memory devices, and a third memory device of the plurality of memory devices, such that the first memory device is comprised in the first row, the second memory device is comprised in the second row, and the third memory device is comprised in the third row;
a plurality of memory channels including a first memory channel directly connecting the first memory device and the second memory device of the first column and a second memory channel directly connecting the first memory device and the third memory device of the first column, the second memory device being disposed between the first memory device and the third memory device, wherein the memory devices in the first column are not directly connected to the memory devices in any other column of the plurality of columns; and
a plurality of processor channels including a first processor channel connecting each of the memory devices in the first row to only a first processor, a second processor channel connecting each of the memory devices in the second row to only a second processor, and a third processor channel connecting each of the memory devices in the third row to only a third processor,
wherein the first processor channel does not directly connect to any of the memory devices in the second row and the third row, the second processor channel does not directly connect to any of the memory devices in the first row and the third row, and the third processor channel does not directly connect to any of the memory devices in the first row and the second row, and
wherein the memory devices in the first row are not directly connected to other memory devices in the first row, the memory devices in the second row are not directly connected to other memory devices in the second row, and the memory devices in the third row are not directly connected to other memory devices in the third row.

6. The system of claim 5, wherein each of the plurality of processors is a CPU or a GPU.

7. The system of claim 5, wherein the first processor connected to the memory devices in the first row is a CPU, and the second processor connected to the memory devices in the second row is a GPU.

8. The system of claim 5, wherein each of the plurality of memory devices comprises a pass-thru path configured to directly output an input signal, and the pass-thru path is configured to connect two neighboring memory devices in a column among the plurality of columns or to connect any of memory devices in the column and a corresponding processor.

9. The system of claim 8, wherein in a first routing path including the pass-thru path, a first data packet associated with the first processor has a higher routing priority than a second data packet associated with the second processor, wherein the first processor is a CPU and the second processor is a GPU.

* * * * *